W. M. GILLAN.
Horse Hay-Fork.
No. 83,705.
Patented Nov. 3, 1868.
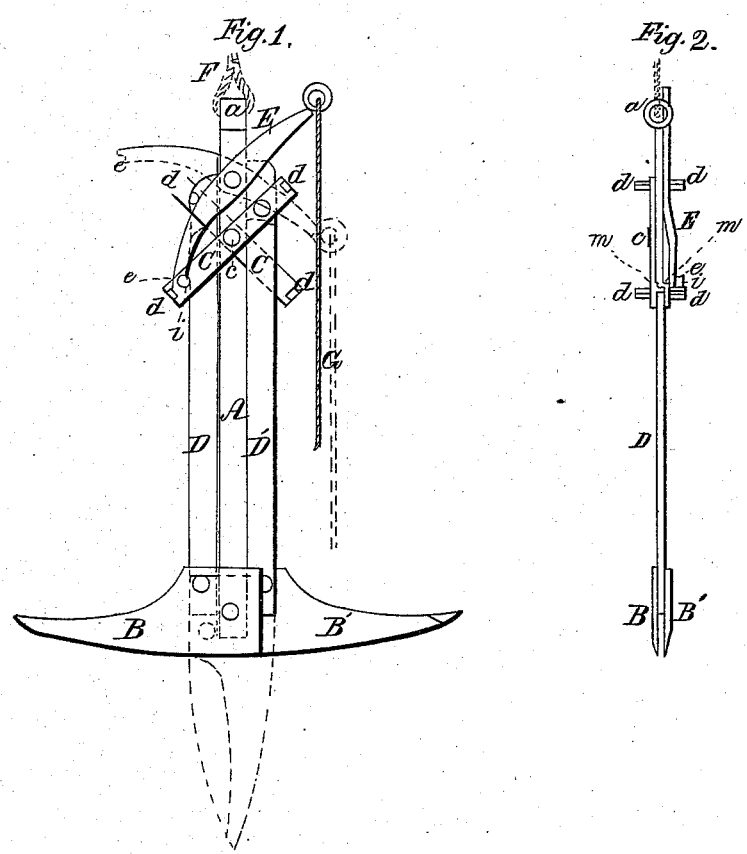

WILLIAM M. GILLAN, OF MOUNT PARNELL, PENNSYLVANIA.

Letters Patent No. 83,705, dated November 3, 1868.

IMPROVEMENT IN HORSE HAY-FORKS.

The Schedule referred to in these Letters Patent and making part of the same.

*To all whom it may concern:*

Be it known that I, WILLIAM M. GILLAN, of Mount Parnell, in the county of Franklin, and State of Pennsylvania, have invented a new and improved Horse Hay-Fork; and I do hereby declare that the following is a full, clear, and exact description of the construction and operation of the same, reference being had to the accompanying drawings, making a part of this specification, in which—

Figure 1 is a side view.

Figure 2 is an edge view.

In this invention, the lower end of the fork is provided with two opening-and-shutting blades, which are capable of being locked in position, or unlocked, by means of a novel, and very simple, strong, and durable device, at the upper end of the fork.

In the drawings, A is a vertical bar, of iron or steel, provided with a loop, ring, or link, $a$, at its upper end, by which to raise and lower it, and having two opening-and-shutting blades, B B', pivoted at its lower end, one on one side, and the other on the other side.

C C' are two levers, both pivoted on a single bolt, $c$, extending through the upper part of bar A, one operating on each side of said bar.

Each lever has a pin or handle, $d$, at both ends, and is connected to each of the blades B B', by means of a rod, D D', alongside of the central bar A, the rod being jointed to the lever above and the blade below, in the manner shown in the drawings.

In fig. 1, the blades are represented as open. If it is desired to close them, the operator, by means of the handles $d$ $d$, or in any other convenient manner, reverses the position of the levers C C'.

The weight of the hay would be sufficient to drag the blades down, and thereby reverse the levers, unless some provision were made whereby they could be locked, so as to hold the blades in a horizontal position while elevating the hay. This is easily effected by means of a curved pivoted arm, E, having a notch, $e$, at its lower end, and operating against a pin, $i$, on one of the levers, in the manner of a stop or trigger.

The blades are opened, and the trigger E set, as seen in fig. 1. This securely holds the rod D' and blade B' in the proper position, while at the same time a small pin, $m$, projecting from the rear side of the arm E, enters a notch in the outer edge of the rod D, and holds the latter rod and the connected blade B firmly in position.

Thus adjusted, the whole apparatus, with its load of hay or straw, is raised to the required height by the rope F. When it reaches that height, the workman pulls a cord, G, which disengages the arm E from the pin $i$, and allows the hay to close the blades, as shown in red lines, fig. 1, and escape therefrom by its own weight. The instrument is then lowered for another load.

When loaded, the blades are expanded and locked in position, and the hay is raised and discharged as before.

This construction is not only very simple, making a cheap, strong, and convenient hay-fork, but it is such as to admit of sharpening the edges of the blades, so that when expanded, as shown in fig. 1, they will operate as a very effective instrument for cutting through hay in stacks, mows, &c.

The blades can be made three or four times as long as in other instruments for a similar purpose, and the process of thrusting the fork into the hay, and then extending the blades, is much simpler and easier than with other forks, it being only necessary for the operator to grasp the instrument by two of the handles, $d$ $d$, and thrust its point into the hay. As the blades penetrate the hay, they will open, or he can force them open, by means of the handles. When fully open, a slight pressure upon the arm E locks them.

Having thus described my invention,

What I claim as new, and desire to secure by Letters Patent, is—

The centre bar A, side rods D D', levers C C', arm E, with the notch $e$ and blades B B', all in combination, and arranged as and for the purposes set forth.

WILLIAM M. GILLAN.

Witnesses:
J. McKENNEY,
W. A. McKENNEY.